United States Patent
Watanabe et al.

(10) Patent No.: US 7,299,423 B2
(45) Date of Patent: Nov. 20, 2007

(54) IMAGE SENSING SYSTEM

(75) Inventors: Mikio Watanabe, Asaka (JP); Minoru Arai, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 635 days.

(21) Appl. No.: 10/072,893

(22) Filed: Feb. 12, 2002

(65) Prior Publication Data

US 2002/0109733 A1    Aug. 15, 2002

(30) Foreign Application Priority Data

Feb. 13, 2001    (JP)    ............................. 2001-034796

(51) Int. Cl.
    *G06F 13/00*    (2006.01)
    *H04N 5/225*    (2006.01)
(52) U.S. Cl. .................. 715/838; 715/851; 348/333.11
(58) Field of Classification Search ................ 715/763, 715/765, 727, 853, 840, 810, 838, 839, 851; 348/333.11, 207.1
    See application file for complete search history.

(56) References Cited

U.S. PATENT DOCUMENTS

| 6,515,704 B1 * | 2/2003 | Sato | 348/333.11 |
| 6,618,553 B1 * | 9/2003 | Shiohara | 386/117 |
| 6,707,570 B1 * | 3/2004 | Gotanda et al. | 358/1.15 |
| 6,832,102 B2 * | 12/2004 | I'Anson | 455/556.1 |

FOREIGN PATENT DOCUMENTS

| JP | 63-061568 | 3/1988 |
| JP | 05-219428 | 8/1993 |
| JP | 06-205274 | 7/1994 |
| JP | 07-245723 | 9/1995 |
| JP | 11-331762 | 11/1999 |
| JP | 2000-023015 | 1/2000 |
| JP | 2000-175099 | 6/2000 |

* cited by examiner

*Primary Examiner*—Cao (Kevin) Nguyen
(74) *Attorney, Agent, or Firm*—Birch, Stewart, Kolasch & Birch, LLP

(57) ABSTRACT

The image of a subject is sensed in a photo studio using a digital still camera, and a thumbnail image containing less data than a high-resolution main image representing the image of the subject is generated. Data representing the generated thumbnail image is transmitted to a file apparatus located in another room. The thumbnail-image data requires a shorter transmission time because it contains a smaller amount of data. As a result, the thumbnail image representing the subject is displayed more rapidly.

35 Claims, 11 Drawing Sheets

IMAGE SENSING SYSTEM

BACKGROUND OF THE INVENTION

1. Field of the Invention

This invention relates to an image sensing system, a digital still camera and an image data receiving apparatus that construct the image sensing system, an image data communication system, an image data transmitting apparatus and an image data receiving apparatus that construct the image data communication system, a method of controlling the operation of a digital still camera, a method of controlling the operation of an image data receiving apparatus and a method of controlling the operation of an image data transmitting apparatus.

2. Description of the Related Art

Consideration has been given to a system in which image data obtained by image sensing using a digital still camera is transmitted to an image data receiving apparatus by utilizing a short-distance communication technique such as Bluetooth. When the image of a subject is sensed using the digital still camera in this system, image data representing the image of the subject is stored on a memory card loaded in the digital still camera and is transmitted to the image data receiving apparatus.

When the image data transmitted from the digital still camera is received by the image data receiving apparatus, the image of the subject represented by the received image data is displayed on the display screen of a display device connected to the image data receiving apparatus. The user can observe the image of the subject displayed on the large display screen of the display device rather than on the small display screen provided on the back of the digital still camera.

As the number of pixels used in the CCD of a digital still camera increases, so does the amount of image data obtained by the sensing of an image. When the amount of data increases, the time needed to transmit image data from the digital still camera to the image data receiving apparatus becomes longer. This lengthens also the time from sensing of the image of the subject to display of the image on the display device connected to the image data receiving apparatus.

SUMMARY OF THE INVENTION

Accordingly, an object of the present invention is to shorten the time it takes for the image of a subject to be displayed on the display screen of a display device connected to an image data receiving apparatus.

Another object of the present invention is to so arrange it that desired main-image data can be acquired in an image data receiving apparatus.

According to a first aspect of the present invention, there is provided an image sensing system comprising a digital still camera (inclusive of a personal digital assistant having a camera function) and an image data receiving apparatus.

The digital still camera includes an image sensing device for sensing the image of a subject and outputting main-image data representing the image of the subject; a recording controller for recording the main-image data output from the image sensing device on a recording medium in association with an identification code that identifies the image of the subject; a thumbnail-image data generating device for generating thumbnail-image data that represents a thumbnail image the amount of data whereof is less than that of the image of the subject represented by the-main-image data output from the image sensing device; and a thumbnail-image data transmitting device for transmitting the thumbnail-image data generated by the thumbnail-image data generating device to the image data receiving apparatus in association with the identification code that corresponds to the corresponding image of the subject.

The image data receiving apparatus includes an image data receiving device for receiving thumbnail-image data transmitted from the thumbnail-image data generating device of the digital still camera and with which the identification code has been associated; and a display controller for controlling a display device in such a manner that the thumbnail image represented by the thumbnail-image data received by the image data receiving device will be displayed in association with the corresponding identification code.

The digital still camera and image data receiving apparatus may be constructed as stand-alone devices that are independent of each other.

The first aspect of the present invention provides also a method of controlling operation of the above-described digital still camera. Specifically, the invention provides a method of controlling operation of a digital camera comprising the steps of sensing the image of a subject and outputting main-image data representing the image of the subject; recording the main-image data obtained by image sensing on a recording medium in association with an identification code that identifies the obtained image of the subject; generating thumbnail-image data that represents a thumbnail image the amount of data whereof is less than that of the image of the subject represented by the main-image data obtained by image sensing; and transmitting the thumbnail-image data generated to an image data receiving apparatus in association with the identification code that corresponds to the corresponding image of the subject.

The first aspect of the present invention further provides a method of controlling operation of the above-described image data receiving apparatus. Specifically, the invention provides a method of controlling operation of an image data receiving apparatus comprising the steps of receiving thumbnail-image data transmitted from a digital still camera and with which has been associated an identification code of a corresponding image of a subject; and controlling a display device in such a manner that the thumbnail image represented by the thumbnail-image data received will be displayed in association with the corresponding identification code.

In accordance with the first aspect of the present invention, main-image data representing the image of a subject is obtained when the image of the subject is sensed by a digital still camera. The main-image data is recorded on a recording medium (which may or may not be removable from the digital still camera) in association with an identification code that identifies the image of the subject. A thumbnail image corresponding to the image of the subject represented by the main-image data is generated. The data representing the generated thumbnail image is transmitted from the digital still camera to an image data receiving apparatus in association with an identification code of the corresponding image of the subject.

When the thumbnail-image data transmitted from the digital still camera is received by the image data receiving apparatus, the thumbnail image represented by the received thumbnail-image data is displayed on the display screen of the display device.

The image data transmitted from the digital still camera to the image data receiving apparatus is thumbnail-image data that contains less data than the main-image data. This makes transmission time shorter than when the main-image data is transmitted. The image (thumbnail image) corresponding to the image of the subject obtained by image sensing can be displayed comparatively promptly.

The image data receiving apparatus preferably is further provided with an identification code input device and an output device for reading main-image data, which corresponds to the identification code entered from the identification code input device, from the recording medium and outputting the main-image data.

The user enters an identification code regarding the displayed thumbnail image. When this done, the main-image data corresponding to the entered identification code is read from the recording medium loaded in the digital still camera. The read main-image data is output from the image data receiving apparatus.

The user observes a thumbnail image and can obtain the main-image data that corresponds to this thumbnail image. Since the main-image data is greater in quantity that the thumbnail-image data, the main image can withstand close scrutiny when it is printed. Thus it is possible to obtain high-resolution image data while maintaining the speedy display of the image (the thumbnail image) that corresponds to the image of the subject.

The image data receiving apparatus may further comprise a user code input device for entering a code that specifies a user; a user code discriminating device for determining whether the user code entered from the user code input device is legitimate; and a printer controller for controlling a printer in such a manner that the image of a subject represented by main-image data output from the output device will be printed in response to a determination by the user code discriminating device that the entered user code is legitimate.

Thus, an authorized user is capable of printing an image.

The digital still camera may further comprise an image-sensing controller for allowing succeeding sensing of the image of a subject by the image sensing device in response to completion of recording of the main-image data on the recording medium by the first recording controller and of transmission of the thumbnail-image data by the thumbnail-image data transmitting device.

The next image sensing operation is allowed in response to completion of recording of the main-image data on the recording medium and of transmission of the thumbnail-image data to the image data receiving apparatus. As a result, processing for sensing the image of a subject will not be executed during the course of recording processing and transmission processing. This makes it possible to prevent destruction of the main-image data and thumbnail-image data.

A data line that applies main-image data from the image sensing device to the first recording controller and a data line that applies thumbnail-image data from the thumbnail-image data generating device to the thumbnail-image data transmitting device may have portions in common. If such is the case, the first recording controller may record the main-image data on the recording medium in response to pressing of a shutter-release button. The digital still camera further comprises a buffer memory for temporarily storing main-image data that is output from the image sensing device; a first discriminating device for determining whether the shutter-release button has been pressed during transmission of thumbnail-image data by the thumbnail-image data transmitting device; a memory controller for controlling the buffer memory in such a manner that main-image data that is output from the image sensing device is stored in the buffer memory temporarily in response to a determination by the first discriminating device that the shutter-release button has been pressed; and a second recording controller for recording the main-image data, which has been stored temporarily in the buffer memory, on the recording medium in response to a determination that transmission of thumbnail-image data by the thumbnail-image data transmitting device has been completed.

Main-image data that has been obtained by pressing the shutter-release button is stored in the buffer memory temporarily until transmission of the thumbnail-image data to the image-data receiving apparatus is completed. When the transmission of the thumbnail-image data to the image data receiving apparatus ends, the main-image data is read out of the buffer memory and recorded on the recording medium. Since recording of the main-image data on the recording medium will not be carried out during transmission of the thumbnail-image data, conflict between these two types of image data can be prevented even if a data line that applies the main-image data from the image sensing device to the first recording controller and a data line that applies thumbnail-image data from the thumbnail-image data generating device to the thumbnail-image data transmitting device have portions in common.

A second aspect of the present invention relates to an image data communication system comprising an image data transmitting apparatus and an image data receiving apparatus that are capable of communicating with each other.

The data receiving apparatus comprises an image data receiving device for receiving thumbnail-image data transmitted from a digital still camera and with which has been associated an identification code that identifies the image of a subject; a display controller for controlling a display device in such a manner that the thumbnail image represented by the thumbnail-image data received by the image data receiving device will be displayed in association with the corresponding identification code; an identification code input device for entering the identification code; and an identification-code data transmitting device for transmitting data, which represents the identification code entered by the identification code input device, to the image data transmitting apparatus.

The image data transmitting apparatus comprises an identification-code data receiving device for receiving data representing an identification code transmitted from the identification-code data transmitting device of the image data receiving apparatus; a reading device for reading main-image data, which corresponds to an identification code represented by identification-code data received by the identification-code data receiving device, from a recording medium on which has been recorded the main-image data with which the identification code is associated; and a main-image data transmitting device for transmitting the main-image data read by the reading device to the image data receiving apparatus.

The second aspect of the present invention provides also a method of controlling operation of an image data receiving apparatus. Specifically, the invention provides a method of controlling operation of an image data receiving apparatus comprising the steps of receiving thumbnail-image data transmitted from a digital still camera and with which has been associated an identification code that identifies the image of a subject; controlling a display device in such a manner that the thumbnail image represented by the received thumbnail-image data will be displayed in association with the corresponding identification code; and transmitting data, which represents the entered identification code, to the image data transmitting apparatus.

The second aspect of the present invention provides also a method of controlling operation of an image data transmitting apparatus. Specifically, the invention provides a method of controlling operation of an image data transmitting apparatus comprising the steps of receiving data representing an identification code transmitted from an image data receiving apparatus; reading main-image data, which corresponds to an identification code represented by received identification-code data, from a recording medium on which has been recorded the main-image data with which the identification code is associated; and transmitting the read main-image data to the image data receiving apparatus.

In accordance with the second aspect of the present invention, thumbnail-image data, which has been transmitted from a digital still camera and with which an identification code has been associated is received by an image data receiving apparatus. The thumbnail image represented by the thumbnail-image data is displayed in association with the identification code.

When an identification code is entered, data representing the identification code is transmitted from the image data receiving apparatus to an image data transmitting apparatus.

The image data transmitting apparatus receives data representing an identification code transmitted from the image data receiving apparatus. A recording medium on which main-image data associated with an identification code has been recorded is loaded in the image data transmitting apparatus or is connected thereto in readable fashion. Main-image data corresponding to a received identification code is read from the recording medium. The read main-image data is transmitted from the image data transmitting apparatus to the image data receiving apparatus.

The necessary main-image data can be obtained at the image data receiving apparatus. Since the main-image data contains more data than the thumbnail-image data, a high-resolution image can be obtained. This makes it possible to obtain an image that can withstand scrutiny even when printed.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of the present invention will now be described in detail with reference to the drawings.

Figure 1:
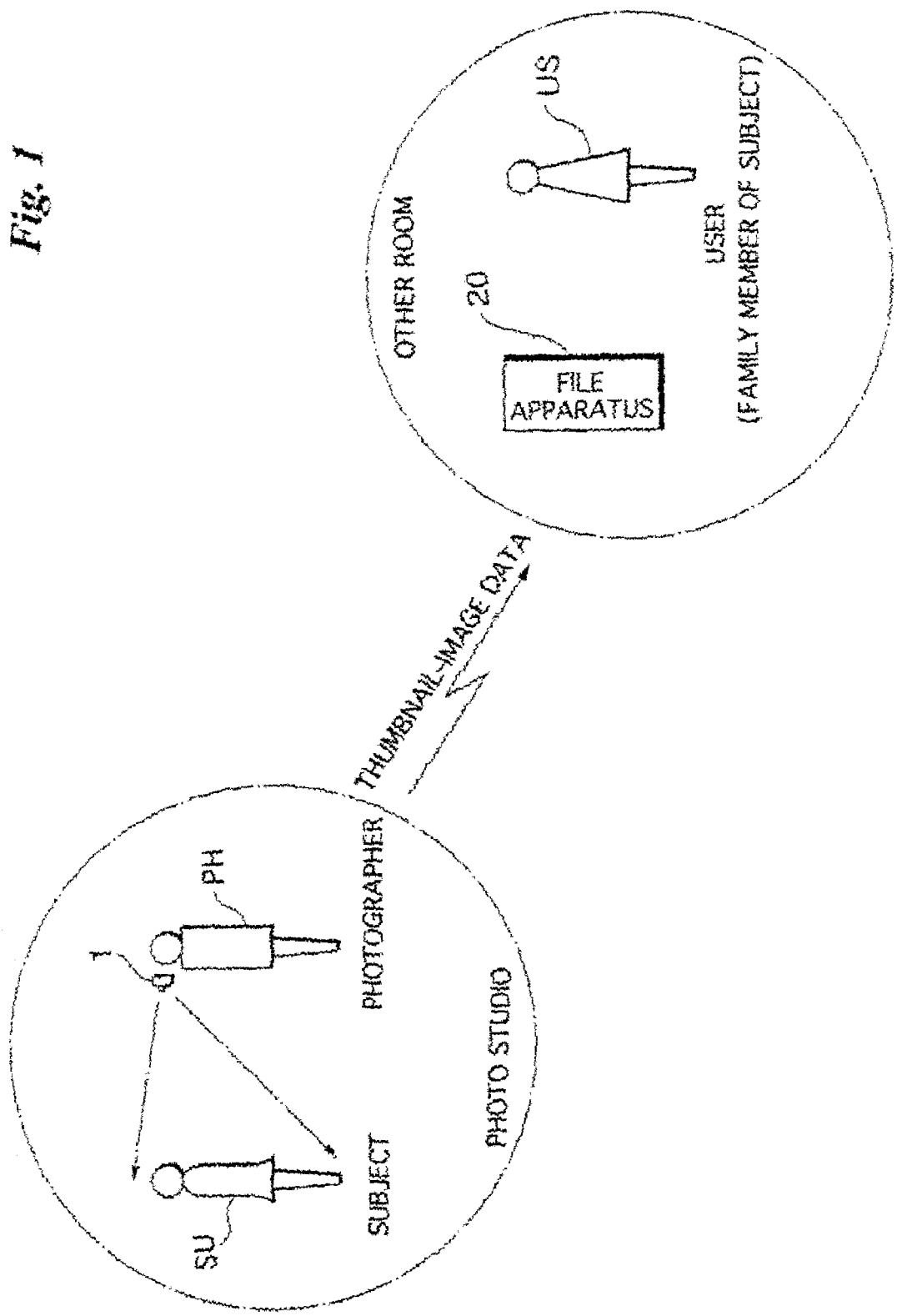
FIG. 1 shows the manner in which an image sensing system is used according to a first embodiment of the present invention.

FIG. 1, which illustrates a first embodiment of the invention, shows the manner in which an image sensing system is used.

The image sensing system comprises a digital still camera 1 and a file apparatus 20 capable of communicating with each other over a short distance.

A photographer PH takes the picture (senses the image) of a subject SU by using the digital still camera 1. The sensing of the image is performed in a photo studio, by way of example.

A user (e.g., if the subject is a person, the user might be a member of this person's family) US waits in a room separate from the photo studio. The file apparatus 20 is placed in this room and has a display device connected to it.

When pictures of the subject SU are taken by the photographer PH using the digital still camera 1, the latter generates thumbnail images of the images of the subject. The generated thumbnail-image data is transmitted from the digital still camera 1 to the file apparatus 20.

The thumbnail images of the subject whose image has been sensed are displayed on the display screen of the display device connected to the file apparatus 20 placed in the room separate from the studio. While viewing the thumbnail images displayed, the user selects the image to be printed.

Thus, the image to be printed can be selected while images of the subject SU are being sensed. Image data transmitted from the digital still camera 1 to the file apparatus 20 is thumbnail-image data and not the image data obtained by sensing the image of the subject. The thumbnail-image data is small in quantity and therefore can be transmitted in a short period of time. This means that the thumbnail images can be displayed quickly. Further details will become apparent from the description that follows.

Figure 2:
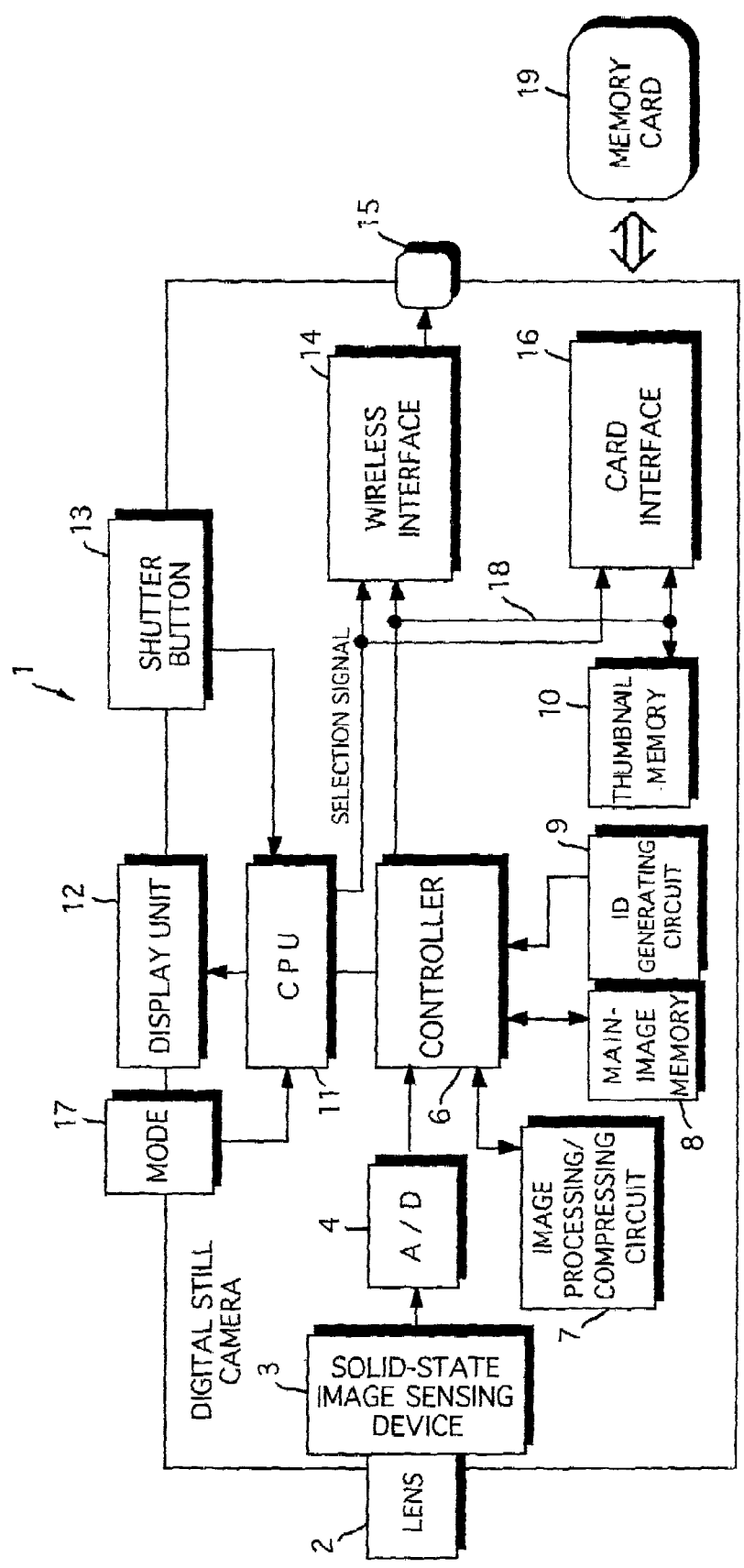
FIG. 2 is a block diagram illustrating the electrical construction of a digital still camera according to this embodiment.

FIG. 2 is a block diagram showing the electrical construction of the digital still camera 1.

The overall operation of the digital still camera 1 is controlled by a CPU 11.

The digital still camera 1 is provided with a mode switch 17 by which it is possible to set an ordinary imaging mode (in which the camera does not communicate with the file apparatus 20), a wireless communication imaging mode (in which the camera communicates with the file apparatus 20) and a playback mode. A signal representing the mode set by the mode switch 17 is input to the CPU 11.

The digital still camera 1 is further provided with a shutter button 13. A signal indicating that the shutter button 13 has been pressed also is input to the CPU 11.

If the wireless communication imaging mode is selected by the mode switch 17 (the ordinary imaging mode and playback mode have no direct bearing upon this invention and need not be described), the image of the subject is formed on the photoreceptor surface of a solid-state image sensing device (CCD, etc.) by an imaging lens 2. A video signal representing the image of the subject is output from the solid-state image sensing device 3.

The video signal is converted to digital image data by an analog/digital converter circuit 4. The digital image data is applied to a display device 12 by a controller 6 via the CPU 11 so that the image of the subject is displayed on the display screen of the display device 12.

If the shutter button 13 is pressed, image data (main-image data) output from the analog/digital converter circuit 4 is applied to a main-image memory 8, where the image data is stored. The main-image data is read out of the main-image memory 8 and input to an image processing/compressing circuit 7. The latter executes compression processing and other image processing.

An ID generating circuit 9 generates an image ID for identifying an image.

An image file is generated in such a manner that the generated image ID is recorded in the header of the image file and the compressed main-image data is recorded in an image data recording area of the image file. The generated image file is applied to and recorded on a memory card 19 by the controller 6 via a card interface 16.

The main-image data that has been stored in the main-image memory 8 is subjected to compression processing and the like by the image processing/compressing circuit 7 and thumbnail-image data is generated by the CPU 11, as mentioned above. The generated thumbnail-image data is applied to and stored in a thumbnail memory 10. The thumbnail-image data is applied to an antenna 15 via a wireless interface 14. The thumbnail-image data is transmitted from the antenna 15 to the file apparatus 20.

A data line for applying the compressed image data to the card interface 16 and a data line 18 for applying the thumbnail-image data, which has been stored in the thumbnail memory 10, to the wireless interface 14 have portions in common. However, it goes without saying that mutually independent data lines may be used.

Figure 3:
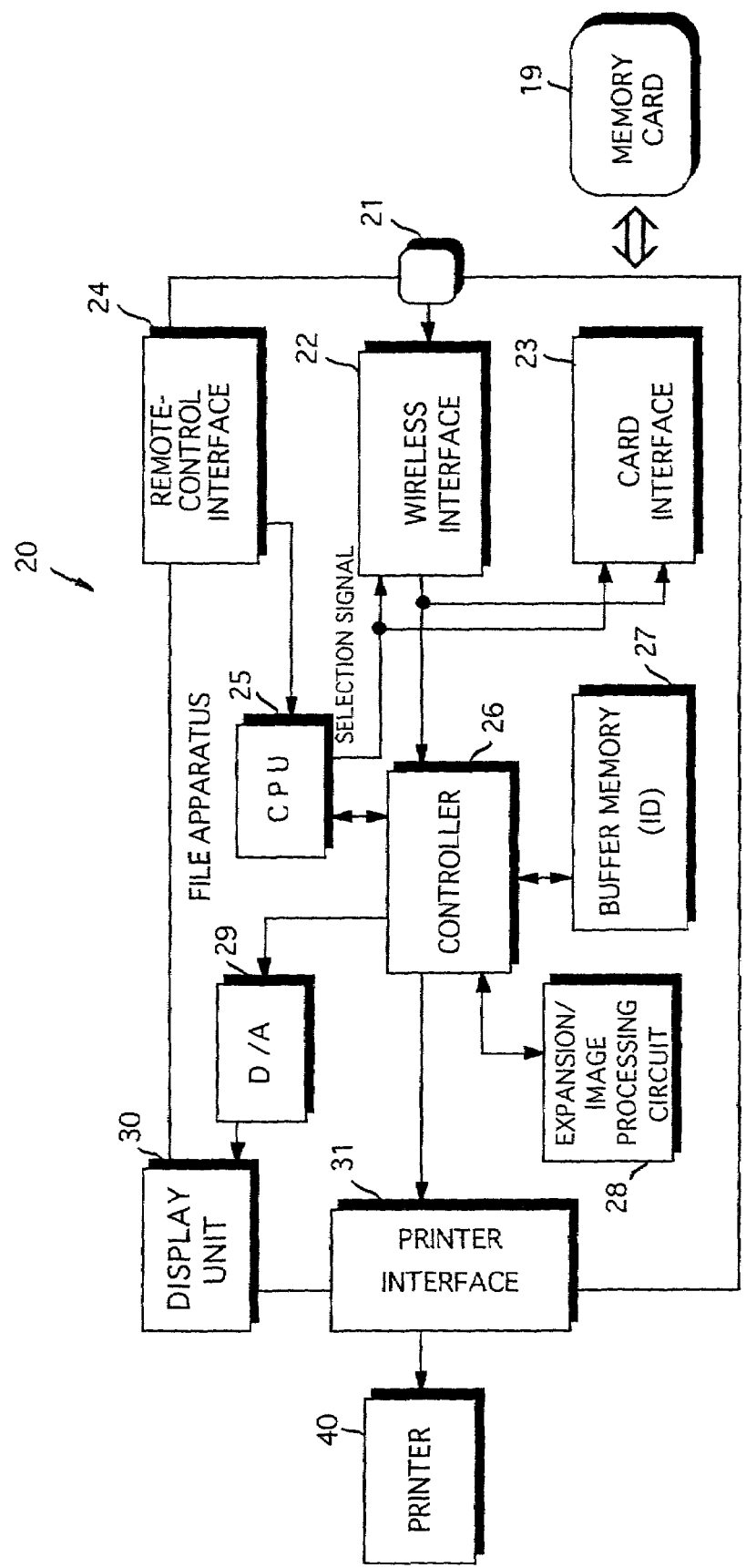
FIG. 3 is a block diagram illustrating the electrical construction of a file apparatus according to this embodiment.

FIG. 3 is a block diagram illustrating the electrical construction of the file apparatus 20.

The overall operation of the file apparatus 20 is controlled by a CPU 25.

Thumbnail-image data transmitted from the digital still camera 1 as described above is received by an antenna 21. The thumbnail-image data received by the antenna 21 is applied to a controller 26 via a wireless interface 22. The thumbnail-image data is input to an analog/digital converter circuit 29 by the controller 26, whereby the data is converted to an analog video signal. The analog video signal is applied to a display device 30 so that the thumbnail image is displayed on the display screen of the display device 30.

Figure 4:
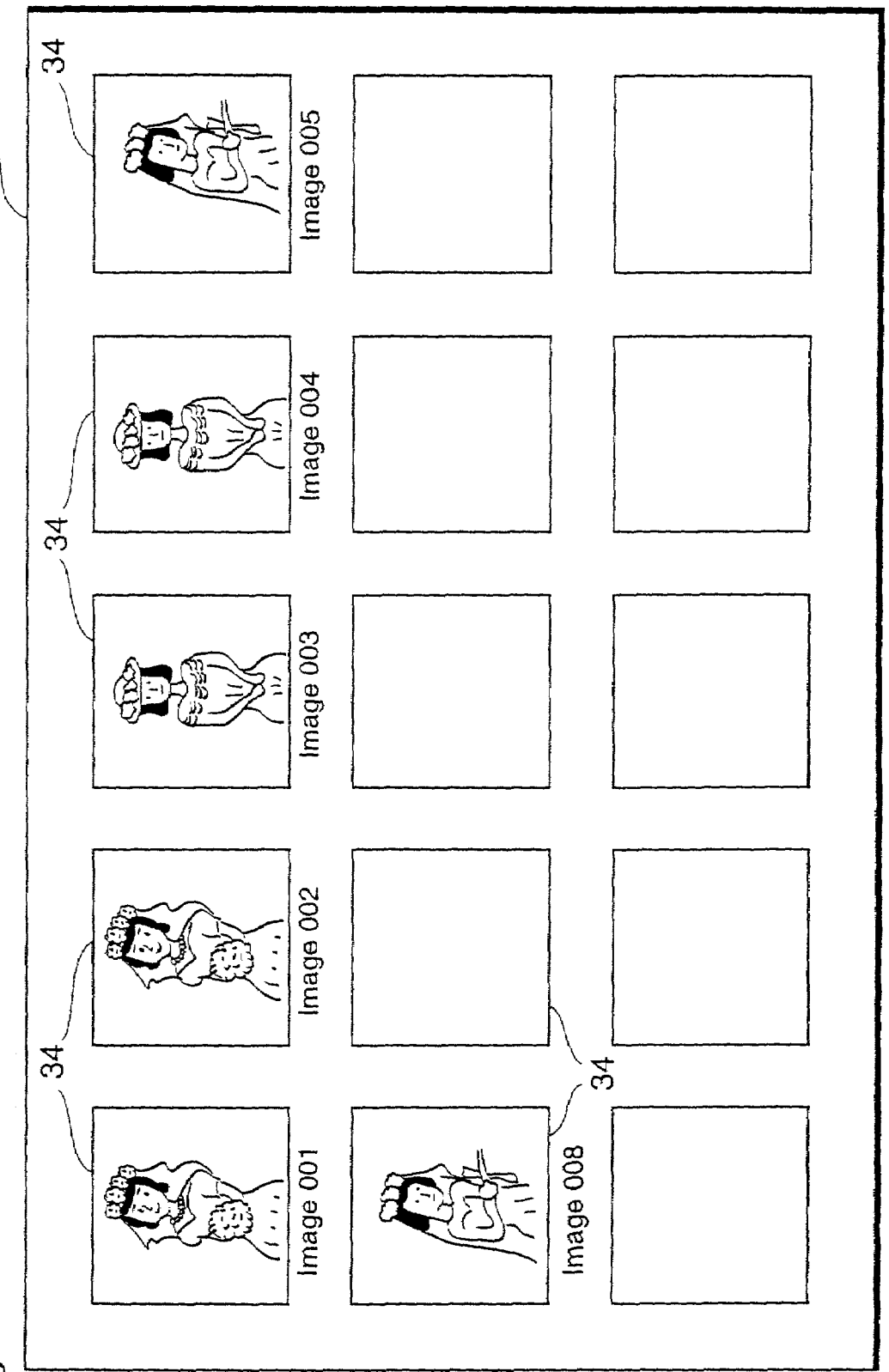
FIG. 4 illustrates examples of thumbnail images displayed on the display device of the file apparatus.

FIG. 4 shows an example of a display screen 33 of the display device 30.

The display screen 33 is formed to have a number of display areas 34 for displaying thumbnail images. A thumbnail image represented by thumbnail-image data transmitted from the digital still camera 1 is displayed in each thumbnail-image display area 34.

Displayed below each thumbnail image is the image ID (Image 001, etc.) of the thumbnail image. [This is the ID of the main image (the image represented by main-image data) that corresponds to the thumbnail image. Though the image ID of the thumbnail image and the ID of the main image that corresponds to this thumbnail image are the same, the image IDs need not necessarily be the same as long as the corresponding relationship between the thumbnail image and the main image is known.] The thumbnail image and the main image can be specified by the image ID.

With reference again to FIG. 3, the file apparatus 20 is capable of being remote-controlled by a remote controller (not shown). A control signal transmitted from the remote controller is received by a remote-control interface 24. The remote-control signal also includes data that indicates an image ID specified by the user.

The received remote-control signal is input to the CPU 25. If the remote-control signal includes data indicative of an image ID, the data representing the image ID is extracted from the signal by the CPU 25. The data representing the image ID is applied to and stored in a buffer memory 27 by the controller 26.

The file apparatus 20 is provided with a card interface 23. The memory card 19 on which an image file containing compressed main-image data has been recorded in the manner described above can be loaded in the file apparatus 20. When the memory card 19 is loaded in the file apparatus 20, the header of the image file recorded on the memory card 19 is read. The image ID that has been recorded in the header is input to the CPU 25 via the card interface 23.

The CPU 25 compares the image ID read from the memory card 19 and the image ID that has been stored in the buffer memory 27. If an image ID the same as the image ID read from the memory card 19 has been stored in the buffer memory 27, then it is judged that the main-image data specified by the image ID read from the memory card 19 represents the main image specified by the user. The main-image data for which the same image ID has been stored in the buffer memory 27 is read from the memory card 19.

Since the main-image data that has been read from the memory card 19 is compressed data, this data is applied to an expansion/image processing circuit 28 by the controller 26, whereby the compressed main-image data is subjected to predetermined playback processing such as expansion.

The expanded main-image data is applied to a printer interface 31 by the controller 26. The main image corresponding to the thumbnail image selected by the user is printed by a printer 41 connected to the printer interface 31.

Figure 5:
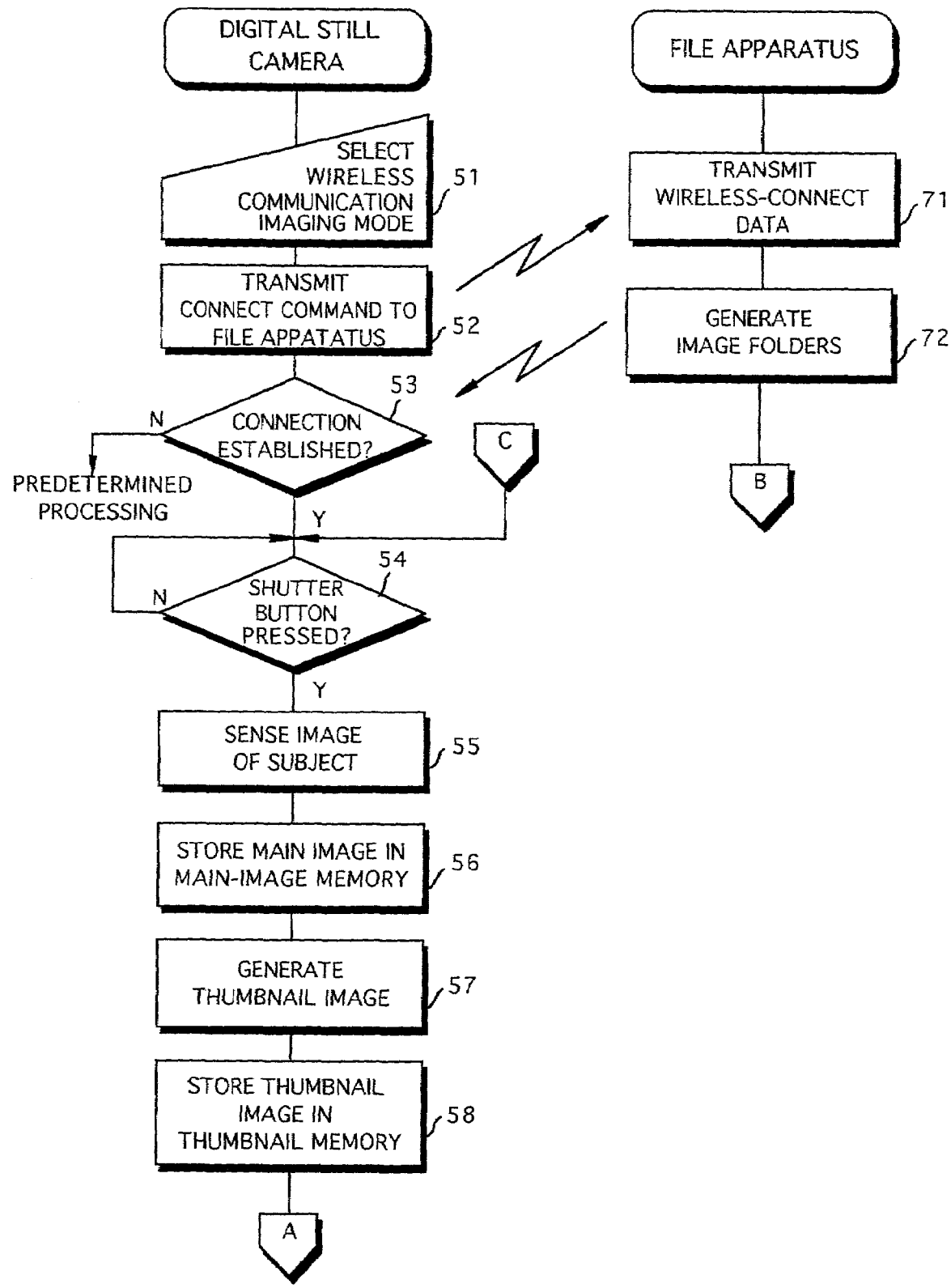
FIGS. 5 and 6 are flowcharts showing processing for implementing communication between the digital still camera and the file apparatus according to this embodiment.
Figure 6:
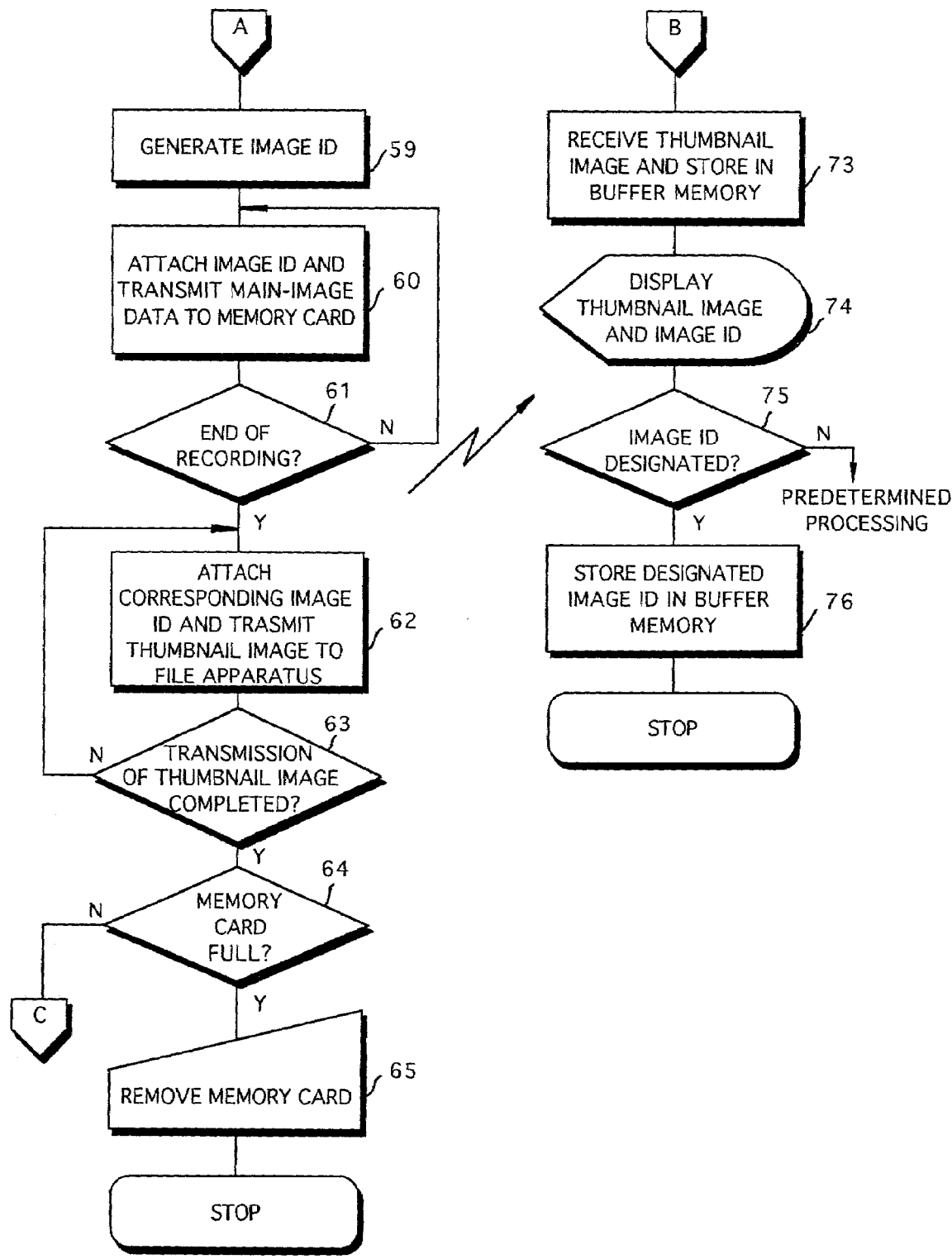

FIGS. 5 and 6 are flowcharts illustrating processing executed by the digital still camera 1 and file apparatus 20.

The power supply of the digital still camera 1 is turned on and the wireless communication imaging mode is selected by the photographer PH (step 51). As a result, data indicative of a connect command is transmitted from the digital still camera 1 to the file apparatus 20 (step 52).

When the connect command transmitted from the digital still camera 1 is received by the file apparatus 20, the latter sends data indicating that a wireless connection has been made back to the digital still camera 1 (step 71). In addition, the file apparatus 20 creates image folders that are associated by the model name of the digital still camera 1, the date, etc. (step 72).

If data sent back from the file apparatus 20 indicating that the wireless connection has been established is received ("YES" at step 53), it is determined whether the shutter button 13 has been pressed (step 54).

If the shutter button 13 has been pressed ("YES" at step 54), the image of the subject SU is sensed (step 55), as described above, and main-image data representing the image of the subject is obtained. The main-image data is stored in the main-image memory 8 temporarily (step 56). The main-image data stored in the main-image memory 8 may or may not be compressed by the image processing/compressing circuit 7, as mentioned earlier.

The CPU 11 generates thumbnail-image data from the main-image data (step 57). The generated thumbnail-image data is stored in the thumbnail memory 10 (step 58).

The ID generating circuit 9 generates an image ID with respect to the sensed image of the subject (step 59). When the image ID is generated, it is recorded in the header of the image file in which the corresponding main-image data is stored. The main-image file having the image ID recorded in its header and the main-image data recorded in its image data recording area is recorded on the memory card 19 that has been inserted into the digital still camera 1 (step 60). Recording processing continues until the recording of the main-image file ends (step 61).

When recording of main-image data on the memory card 19 ends, the thumbnail-image data representing the thumbnail image that corresponds to the main image is recorded in the thumbnail-image data recording area of the thumbnail-image file and an image ID identical with the image ID of the corresponding main image is stored in the header. The thumbnail-image file is transmitted from the digital still camera 1 to the file apparatus 20 (step 62). Processing for transmitting the thumbnail-image file continues until transmission of the thumbnail-image file ends (step 63).

If the memory card 19 that has been loaded in the digital still camera 1 runs out of vacant space ("YES" at step 64) or when photography ends, the photographer PH removes the memory card 19 from the digital still camera 1 (step 65).

When a thumbnail-image file transmitted from the digital still camera 1 is received by the file apparatus 20, the received thumbnail-image file is stored in the buffer memory 27 (step 73). The thumbnail-image file is read out of the buffer memory 27 and applied to the display device 30. The thumbnail image and the image ID are displayed on the display screen 33 of the display device 30 (step 74), as shown in FIG. 4.

If an image ID is designated by the user ("YES" at step 75), then data representing the designated image ID is stored in the buffer memory 27 (step 76).

Figure 7:
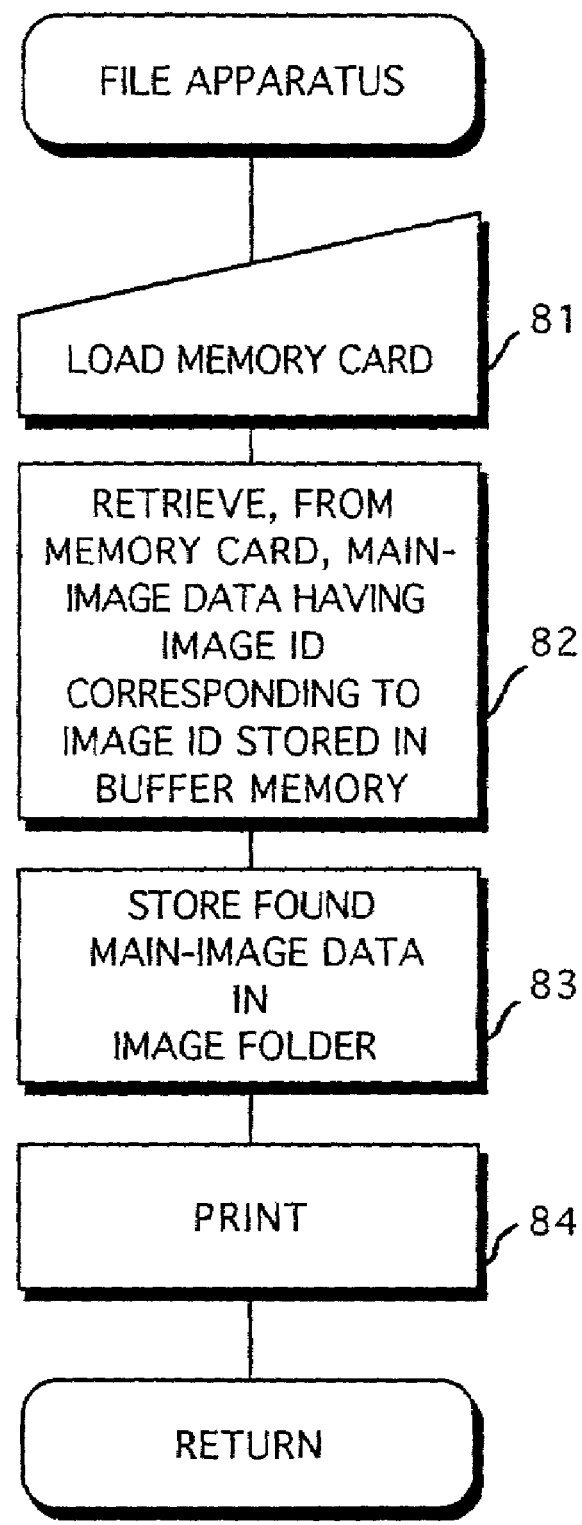
FIG. 7 is a flowchart illustrating processing executed by the file apparatus according to this embodiment.

FIG. 7 is a flowchart illustrating print processing executed by the file apparatus 20.

When sensing of the image of the subject SU ends, the memory card 19 that has been extracted from the digital still camera 1 is loaded in the file apparatus 20 (step 81). The headers of main-image files that have been recorded on the memory card 19 are read and the image IDs that have been recorded in the headers are read. From among the image IDs that have been read from the memory card 19, the main-image data corresponding to an image ID identical with the image ID that has been stored in the buffer memory 27 is read from the memory card 19 (step 82).

The main-image data read from the memory card 19 represents the main image that corresponds to the thumbnail image designated by the user. The data representing this main image is stored in an image folder already generated (step 83).

The main-image data that has been stored in the image folder is applied to the printer 40 via the printer interface 31. The main image corresponding to the thumbnail image designated by the user is printed by the printer 40 (step 84). Since the main image has a high resolution, a high-resolution main image is printed.

Figure 8:
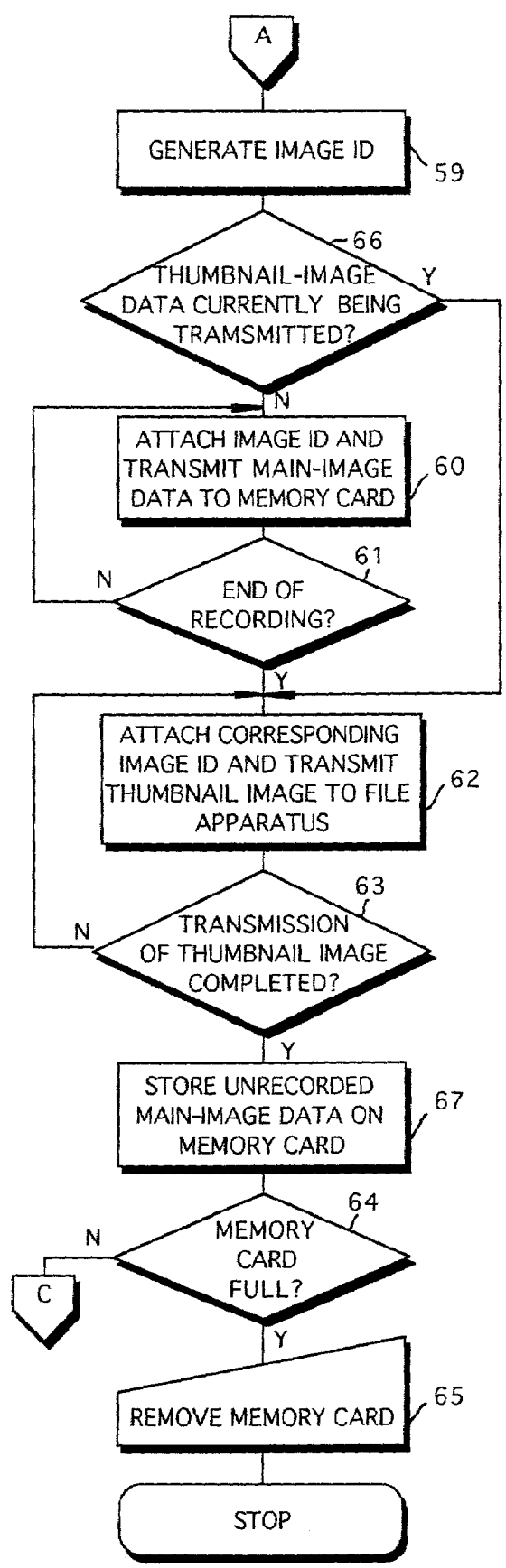
FIG. 8 is a flowchart illustrating a modification of processing executed by the digital still camera.

FIG. 8 is a flowchart illustrating a modification of the processing executed by the digital still camera 1.

Processing steps in FIG. 8 that are identical with those shown in FIG. 6 are designated by like step numbers and need not be described again.

When an image ID is generated in the processing of FIG. 6, the generated image ID is stored in the header and the main-image file is recorded on the memory card 19 without confirming that the thumbnail-image file is being transmitted to the file apparatus 20.

By contrast, in the processing shown in FIG. 8, whether the thumbnail-image file is being transmitted to the file apparatus 20 is checked (step 66).

If transmission of thumbnail-image file is in progress ("YES" at step 66), then the processing of step 60 is skipped. Since transmission of the thumbnail-image data and recording of the main-image data will not take place simultaneously, a conflict of data can be prevented in the digital still camera 1 even if the data line 18 for applying the thumbnail-image data to the wireless interface 14 and the data line 18 for applying the main-image data to the card interface 16 have portions in common.

When transmission of the thumbnail-image data ends ("YES" at step 63), then main-image data not yet recorded on the memory card 19 is recorded on the memory card 19 (step 67).

Figure 9:
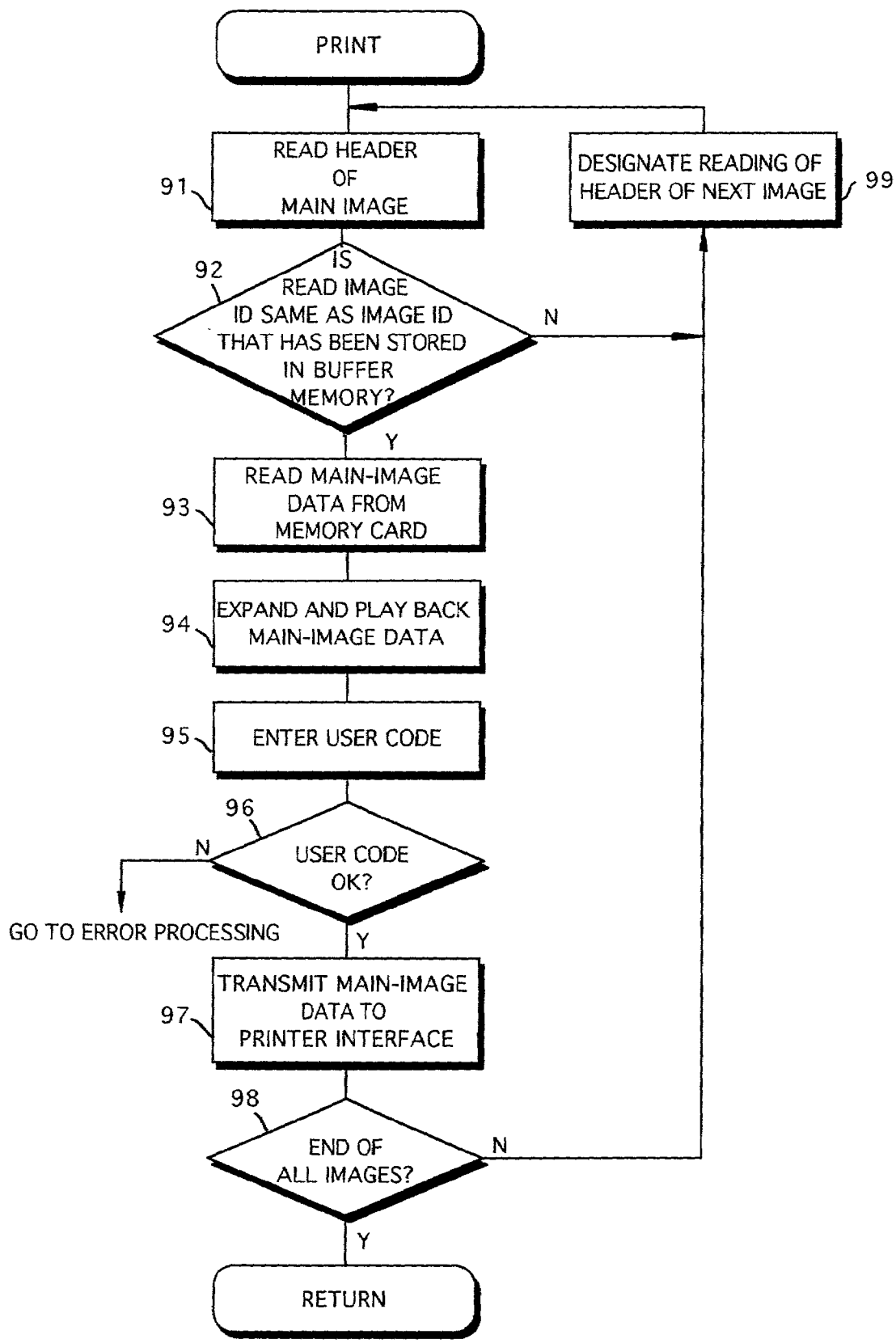
FIG. 9 is a flowchart illustrating print processing.

FIG. 9 is a flowchart illustrating an example of print processing by the file apparatus.

The header of a main-image file that has been recorded on the memory card 19 loaded in the file apparatus 20 is read (step 91). It is determined whether the image ID contained in the read header is the same as an image ID that has been stored in the buffer memory 27 (namely the image ID designated by the user) (step 92). If the two are not the same, a command for reading out the next image file is applied (step 99). The header of the next image file is read.

If the two image IDs are the same ("YES" at step 92), this means that the main-image file is one in which has been stored main-image data representing the main image that corresponds to the thumbnail image designated by the user. The image data is read from the main-image file (step 93). The read main-image data is applied to the expansion/image processing circuit 28 and is subjected to playback processing such as expansion (step 94).

A user code is entered by the user by employing the remote controller (step 95). It is determined whether the user code is one that authorizes printing. If the entered user code is authentic ("YES" at step 96), then the expanded main-image data is applied to the printer interface 31 (step 97) and the main image is printed by the printer 40.

The processing of steps 91 to 93 is repeated for all main-image files that have been recorded on the memory card 19 loaded in the file apparatus 20 (step 98). The header information of the next image is read (step 99).

Figure 10:
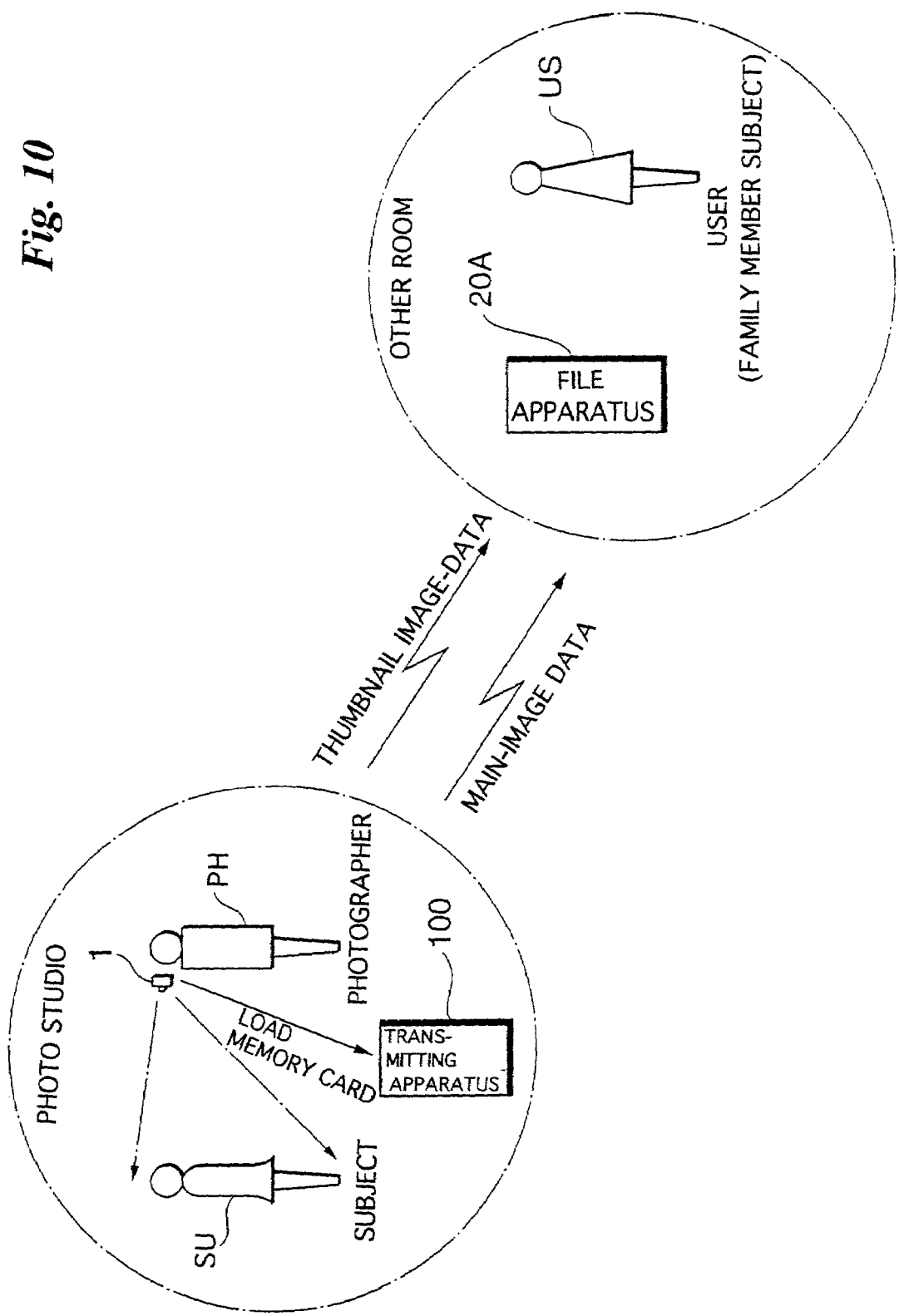
FIG. 10, which illustrates a second embodiment of the invention, shows the manner in which an image sensing system is used.
Figure 11:
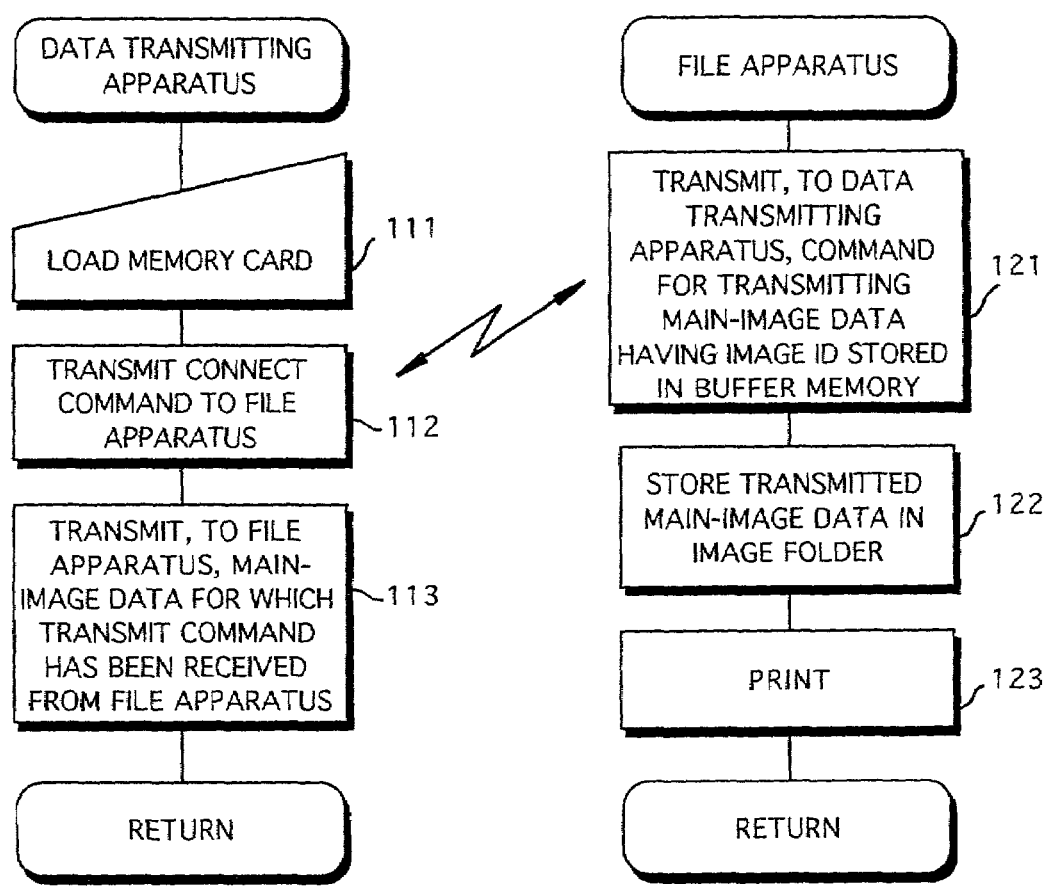
FIG. 11 is a flowchart illustrating processing for implementing communication between an image data transmitting apparatus and the file apparatus according to the second embodiment.

FIGS. 10 and 11 illustrate a second embodiment of the present invention.

FIG. 10 shows the manner in which the image sensing system according to this embodiment is used.

The first embodiment is such that when the image of the subject SU is sensed, the memory card 19 on which the main-image data has been recorded is removed from the digital still camera 1 and then loaded in the file apparatus 20. The main-image data that has been recorded on the loaded memory card 19 is read into the file apparatus 20.

By contrast, in the example of use shown in FIG. 10, the memory card 19 that has been loaded in the digital still camera 1 is removed from the digital still camera 1 and is loaded in an image data transmitting apparatus 100. The latter reads the main-image data that has been recorded on the memory card 19 and can transmit the data to a file apparatus 20A. The main-image data that has been transmitted from the image data transmitting apparatus 100 is received by the file apparatus 20A. (The file apparatus 20A has the same structure as that of the file apparatus 20 but differs in that it transmits data indicative of an image ID to the image data transmitting apparatus 100). The labor involved in bringing the memory card 19 to the other room and loading it in the file apparatus 20 is eliminated.

The image data transmitting apparatus 100 can accept insertion of the memory card 19 and can transmit main-image data to the file apparatus 20A. It therefore has a structure substantially the same as that of the digital still camera 1. An arrangement can be adopted in which the digital still camera 1 is used for the image data transmitting apparatus 100.

FIG. 11 is a flowchart illustrating processing for transmitting main-image data to the file apparatus using the image data transmitting apparatus according to the second embodiment.

The digital still camera 1 is used to sense the image of the subject SU, as described earlier. A main-image file whose image ID has been recorded in the header is recorded on the memory card 19 and a thumbnail-image file whose image ID has been recorded in the header is transmitted from the digital still camera 1 to the file apparatus 20.

The memory card 19 is removed from the digital still camera 1 and is loaded in the image data transmitting apparatus 100 (step 111), whereupon the wireless connect command is transmitted from the image data transmitting apparatus 100 to the file apparatus 20A (step 112).

When the connect command transmitted from the image data transmitting apparatus 100 is received by the file apparatus 20A, a command to transmit the main-image data having the image ID stored in the buffer memory 27 is transmitted from the file apparatus 20A to the image data transmitting apparatus 100 (step 121).

When the transmit command that has been transmitted from the file apparatus 20A is received by the image data transmitting apparatus 100, the main-image file specified by the image ID for which the transmit command has been received is read out of the memory card 19. The main-image file read out is transmitted from the image data transmitting apparatus 100 to the file apparatus 20A (step 113).

When the main-image file transmitted from the image data transmitting apparatus 100 is received by the file apparatus 20A, the received main-image file is stored in the buffer memory 27 (step 122). The main-image file stored in the buffer memory 27 is read out and applied to the printer 40, whereby the main image corresponding to the thumbnail image selected by the user is printed (step 123).

In the embodiments described above, the digital still camera 1 is used in a photo studio and the file apparatus 20 (20A) is used in another room. However, it goes without saying that separate rooms need not necessarily be used.

Further, it goes without saying that some of the above circuitry may be implemented by software rather than hardware.

Communication between the digital still camera and file apparatus may be short-distance wireless communication, which uses a 2.4-GHz carrier, or long-distance wireless communication. Further, if thumbnail-image data can be received, what communicates with the digital still camera can be a printing system and not just a file apparatus. Furthermore, it will suffice if the size of a thumbnail image is smaller than that of the main image. Examples of thumbnail-image size are 160×120 pixels and 640×480 pixels (VGA). In addition, communication is not limited to wireless communication; it is possible to use wired communication that utilizes copper wire or optical cable.

As many apparently widely different embodiments of the present invention can be made without departing from the spirit and scope thereof, it is to be understood that the invention is not limited to the specific embodiments thereof except as defined in the appended claims.

What is claimed is:

1. An image sensing system, comprising:
    a digital still camera and an image data receiving apparatus,
    wherein said digital still camera includes:
        an image sensing device configured to sense an image of a subject and outputting main-image data representing the image of the subject;
        a recording controller configured to record the main-image data output from said image sensing device on a recording medium in association with an identification code that identifies the image of the subject;
        a thumbnail-image data generating device configured to generate thumbnail-image data that represents a thumbnail image the amount of data whereof is less than that of the image of the subject represented by the main-image data output from said image sensing device;
        a thumbnail-image data transmitting device configured to transmit wirelessly the thumbnail-image data generated by said thumbnail-image data generating device to said image data receiving apparatus in association with the identification code that corresponds to the corresponding image of the subject; and
        a controller configured to control said image sensing device, said recording controller, said thumbnail-image data generating device, and said thumbnail-image data transmitting device so as to carryout sensing the image of the subject, recording the main-image data on the recording medium, generating the thumbnail-image data, and transmitting the thumbnail-image data to said image data receiving apparatus in response to set a communication imaging (sensing) mode, establish a communication between said digital still camera and said image data receiving device, and depression of a shutter release button of said digital still camera, and
    wherein said image data receiving apparatus includes:
        an image data receiving device configured to receive wirelessly the thumbnail-image data transmitted from said thumbnail-image data transmitting device of said digital still camera and with which the identification code has been associated; and
        a display controller configured to control a display device in such a manner that the thumbnail image represented by the thumbnail-image data received by said image data receiving device will be displayed in association with the corresponding identification code.

2. The image sensing system according to claim 1, wherein said image data receiving apparatus further includes:
    an identification code input device; and
    an output device configured to read the main-image data, which corresponds to the identification code entered from said identification code input device, from the recording medium and configured to output the main-image data.

3. The image sensing system according to claim 2, wherein said image data receiving apparatus further includes:
    a user code input device configured to enter a code that specifies a user;

a user code discriminating device configured to determine whether the user code entered from said user code input device is legitimate; and a printer controller configured to control a printer in such a manner that the image of the subject represented by the main-image data output from said output device will be printed in response to a determination by said user code discriminating device that the entered user code is legitimate.

4. The image sensing system according to claim 1, wherein the main-image data is recorded in an image file and the identification code is recorded in a header of the image file.

5. The image sensing system according to claim 1, wherein the digital still camera further comprises a wireless interface configured to wirelessly transmit a connect command to the image data receiving apparatus prior to the thumbnail-image data transmitting device of the digital still camera wirelessly transmitting the thumbnail-image data to the image data receiving apparatus, and wherein the image data receiving apparatus further comprises a wireless interface configured to wirelessly receive the connect command from the digital still camera.

6. The image sensing system according to claim 5, wherein the wireless interface of the image data receiving apparatus is configured to wirelessly transmit a connect acknowledgment to the digital still camera in response to the connect command from the digital still camera.

7. The image sensing system according to claim 6, wherein the wireless interface of the digital still camera is configured to wirelessly receive the connect acknowledgment from the image data receiving apparatus, and wherein the thumbnail-image data transmitting device of the digital still camera is configured to wirelessly transmit the thumbnail-image data after the connect acknowledgment from the image data receiving apparatus is received.

8. The image sensing system according to claim 5, wherein the image data receiving apparatus further comprises a controller configured to create one or more image folders associated with the digital still camera in a storage local to the image data receiving apparatus in response to the connect command from the digital still camera.

9. The image sensing system according to claim 8, wherein the association of the digital still camera used by the controller of the image data receiving apparatus in creating the one or more image folders includes a model name of the digital still camera.

10. The image sensing system according to claim 1, wherein the image data receiving apparatus further comprises:

an image selection device configured to allow a user to select one or more thumbnail images displayed on the display device; and a reading device configured to read, from the recording medium recorded by the digital still camera, one or more main-image data corresponding to the one or more thumbnail images selected by the user.

11. The image sensing system according to claim 10, wherein the image selection device of the image data receiving apparatus is configured to store, in a buffer memory, one or more identification codes corresponding to the one or more thumbnail images selected by the user, and wherein the reading device of the image data receiving apparatus is configured to read, from the buffer memory, the one or more identification codes, and to read, from the recording medium, the one or more main-image data corresponding to the one or more identification codes read from the buffer memory.

12. A digital still camera that is capable of communicating, comprising:

an image sensing device configured to sense an image of a subject and configured to output main-image data representing the image of the subject;

a first recording controller configured to record the main-image data output from said image sensing device on a recording medium in association with an identification code that identifies the image of the subject obtained by said image sensing device;

a thumbnail-image data generating device configured to generate thumbnail-image data that represents a thumbnail image the amount of data whereof is less than that of the image of the subject represented by the main-image data output from said image sensing device;

a thumbnail-image data transmitting device configured to transmit wirelessly the thumbnail-image data generated by said thumbnail-image data generating device to an image data receiving apparatus in association with the identification code that corresponds to the corresponding image of the subject; and a controller configured to control said image sensing device, said recording controller, said thumbnail-image data generating device, and said thumbnail-image data transmitting device so as to carryout sensing the image of the subject, recording the main-image data on the recording medium, generating the thumbnail-image data, and transmitting the thumbnail-image data to said image data receiving apparatus in response to set a communication imaging (sensing) mode, establish a communication between said digital still camera and said image data receiving device, and depression of a shutter release button of said digital still camera.

13. The digital still camera according to claim 12, further comprising an image-sensing controller configured to allow a succeeding sensing of the image of a subject by said image sensing device in response to a completion of the recordation of the main-image data on the recording medium by said first recording controller and a completion of the transmission of the thumbnail-image data by said thumbnail-image data transmitting device.

14. The digital still camera according to claim 12, wherein a data line that applies the main-image data from said image sensing device to said first recording controller and a data line that applies the thumbnail-image data from said thumbnail-image data generating device to said thumbnail-image data transmitting device have portions in common and wherein said first recording controller records the main-image data on the recording medium in response to a pressing of a shutter-release button, said camera further comprising:

a buffer memory configured to temporarily store the main-image data that is output from said image sensing device;

a first discriminating device configured to determine whether the shutter-release button has been pressed during transmission of the thumbnail-image data by said thumbnail-image data transmitting device;

a memory controller configured to control said buffer memory in such a manner that the main-image data that is output from said image sensing device is stored in said buffer memory temporarily in response to the determination by said first discriminating device that the shutter-release button has been pressed; and a second recording controller configured to record the main-image data, which has been stored temporarily in said buffer memory, on the recording medium in response to a determination that transmission of thumbnail-image data by said thumbnail-image data transmitting device has been completed.

15. The digital still camera according to claim 12, wherein the main-image data is recorded in an image file and the identification code is recorded in a header of the image file.

16. The digital still camera according to claim 12, further comprising:

a wireless interface configured to wirelessly transmit a connect command to the image data receiving apparatus, wherein the thumbnail-image data transmitting device is configured to transmit the thumbnail-image data to the image data receiving apparatus after the wireless interface transmits the connect command to the image data receiving apparatus.

17. The digital still camera according to claim 16, wherein the wireless interface is configured to wirelessly receive a connect acknowledgment from the image data receiving apparatus, and wherein the thumbnail-image data transmitting device is configured to transmit the thumbnail-image data to the image data receiving apparatus after the wireless interface receives the connect acknowledgment from the image data receiving apparatus.

18. An image data communication system, comprising:
a digital still camera;
an image data receiving apparatus; and
an image data transmitting apparatus,
wherein said digital still camera includes:
an image sensing device configured to sense an image of a subject and outputting main-image data representing the image of the subject;
a recording controller configured to record the main-image data output from said image sensing device on a recording medium in association with an identification code that identifies the image of the subject;
a thumbnail-image data generating device configured to generate thumbnail-image data that represents a thumbnail image the amount of data whereof is less than that of the image of the subject represented by the main-image data output from said image sensing device;
a thumbnail-image data transmitting device configured to transmit wirelessly the thumbnail-image data generated by said thumbnail-image data generating device to said image data receiving apparatus in association with the identification code that corresponds to the corresponding image of the subject; and
a controller configured to control said image sensing device, said recording controller, said thumbnail-image data generating device, and said thumbnail-image data transmitting device so as to carryout sensing the image of the subject, recording the main-image data on the recording medium, generating the thumbnail-image data, and transmitting the thumbnail-image data to said image data receiving apparatus in response to set a communication imaging (sensing) mode, establish a communication between said digital still camera and said image data receiving device, and depression of a shutter release button of said digital still camera, wherein said image data receiving apparatus includes:
an image data receiving device configured to receive wirelessly thumbnail-image data transmitted from a digital still camera and with which has been associated an identification code that identifies the image of a subject;
a display controller configured to control a display device in such a manner that the thumbnail image represented by the thumbnail-image data received by said image data receiving device will be displayed in association with the corresponding identification code;
an identification code input device configured to enter the identification code; and
an identification-code data transmitting device configured to transmit wirelessly data, which represents the identification code entered by said identification code input device, to said image data transmitting apparatus, and wherein said image data transmitting apparatus includes:
an identification-code data receiving device configured to receive wirelessly the data representing the identification code transmitted from said identification-code data transmitting device of said image data receiving apparatus;
a reading device configured to read main-image data, which corresponds to the identification code represented by the identification-code data received by said identification-code data receiving device, from a recording medium on which has been recorded the main-image data with which the identification code is associated; and
a main-image data transmitting device configured to transmit wirelessly the main-image data read by said reading device to said image data receiving apparatus.

19. The image data communication system according to claim 18, wherein the main-image data is recorded in an image file and the identification code is recorded in a header of the image file.

20. The image data communication system according to claim 18, wherein the image data transmitting apparatus further comprises a wireless interface configured to wirelessly transmit a connect command to the image data receiving apparatus, and wherein the image data receiving apparatus further comprises a wireless interface configured to wirelessly receive the connect command from the image data transmitting apparatus.

21. The image data communication system according to claim 20, wherein the identification-code data transmitting device of the image data receiving apparatus is configured to wirelessly transmit the identification code to the image data transmitting device after the connect command is received from the image data transmitting device.

22. The image data communication system according to claim 18, wherein the image data receiving apparatus further comprises an image selection device configured to allow a user to select one or more thumbnail images displayed on the display device, and wherein the identification-code data transmitting device of the image data receiving apparatus is configured to wirelessly transmit to the image data transmitting apparatus an image transmit command along with one or more identification codes, wherein the one or more identification codes transmitted to the image data transmitting apparatus correspond to the one or more thumbnail images selected by the user.

23. The image data communication system according to claim 22,
wherein the image data transmitting apparatus further comprises a wireless interface configured to wirelessly receive the image transmit command from the image data receiving apparatus,
wherein the identification-code data receiving device of the image data transmitting apparatus is configured to wirelessly receive the one or more identification codes transmitted from the image data receiving apparatus in response to the image transmit command from the image data receiving apparatus,
wherein the reading device of the image data transmitting apparatus is configured to read, from the recording medium, one or more main-image data corresponding to the one or more identification codes received by the identification-code data receiving device of the image data transmitting apparatus, and
wherein the main-image data transmitting device of the image data transmitting apparatus is configured to wirelessly transmit to the image data receiving apparatus the one or more main-image data read by the reading device of the image data transmitting apparatus.

24. The image data communication system according to claim 23, wherein the image data receiving device of the image data receiving apparatus is configured to wirelessly receive the one or more main-image data transmitted from the image data transmitting apparatus in response to the image transmit command.

25. A method of controlling operation of a digital still camera, comprising the steps of:
sensing an image of a subject and outputting main-image data representing the image of the subject;
recording the main-image data on a recording medium in association with an identification code that identifies the obtained image of the subject;
generating thumbnail-image data that represents a thumbnail image the amount of data whereof is less than that of the image of the subject represented by the main-image data;
transmitting wirelessly the thumbnail-image data to an image data receiving apparatus in association with the identification code that corresponds to the corresponding image of the subject; and
controlling the image sensing process, the recording process, the thumbnail-image data generating process, and the thumbnail-image data transmitting process so as to carryout sensing the image of the subject, recording the main-image data on the recording medium, generating the thumbnail-image data, and transmitting the thumbnail-image data to an image data receiving apparatus in response to set a communication imaging (sensing) mode, establish a communication between a digital still camera and the image data receiving device, and depression of a shutter release button of the digital still camera.

26. The method of controlling the operation of the digital still camera according to claim 25, wherein the main-image data is recorded in an image file, the method further comprising:
recording the identification code in a header of the image file.

27. The method of controlling the operation of the image data receiving apparatus according to claim 11, wherein the identification code associated with the thumbnail-image data is recorded in a header of an image file and wherein a main-image data related to the thumbnail-image data is recorded in the image file.

28. The method of controlling the operation of the digital still camera according to claim 25, further comprising wirelessly transmitting a connect command to the image data receiving apparatus prior to wirelessly transmitting the thumbnail-image data to the image data receiving apparatus.

29. The method of controlling the operation of the digital still camera according to claim 28, further comprising wirelessly receiving a connect acknowledgment from the image data receiving apparatus after wirelessly transmitting the connect command to the image data receiving apparatus and prior to wirelessly transmitting the thumbnail-image data to the image data receiving apparatus.

30. The method of controlling the operation of the image data receiving apparatus according to claim 28, further comprising:
storing, in a buffer memory, one or more identification codes corresponding to the one or more thumbnail images selected by the user,
wherein the reading step comprises reading, from the recording medium, the one or more main-image data corresponding to the one or more identification codes stored in the buffer memory.

31. The method of controlling the operation of the image data receiving apparatus according to claim 11, further comprising wirelessly receiving a connect command from the image data transmitting apparatus prior to transmitting the identification code to the image data transmitting apparatus.

32. The method of controlling the operation of the image data receiving apparatus according to claim 11, further comprising:
selecting one or more thumbnail images, based on a selection by a user, of thumbnail images displayed on a display; and
wirelessly transmitting, to the image data transmitting apparatus, an image transmit command along with one or more identification codes corresponding to the one or more thumbnail images selected by the user.

33. The method of controlling the operation of the image data receiving apparatus according to claim 32, further comprising:
wirelessly receiving one or more main-image data from the image data transmitting apparatus in response to the image transmit command,
wherein the one or more main-image data received from the image data transmitting apparatus correspond to the one or more identification codes transmitted to the image data transmitting apparatus.

34. The method of controlling the operation of the image data transmitting apparatus according to claim 33, further comprising wirelessly transmitting a connect command to the image data receiving apparatus.

35. The method of controlling the operation of the image data transmitting apparatus according to claim 33, further comprising:
wirelessly receiving an image transmit command along with one or more identification codes from the image data receiving apparatus;
reading, from the recording medium, one or more main-image data corresponding to the received one or more identification codes; and
wirelessly transmitting, to the image data receiving apparatus, the one or more main-image data read from the recording medium.

* * * * *